(12) United States Patent
Miyazaki et al.

(10) Patent No.: US 8,802,298 B2
(45) Date of Patent: Aug. 12, 2014

(54) NON-AQUEOUS ELECTROLYTE SECONDARY CELL

(75) Inventors: Shinya Miyazaki, Naruto (JP); Hironori Shirakata, Tokushima (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 194 days.

(21) Appl. No.: 13/194,548

(22) Filed: Jul. 29, 2011

(65) Prior Publication Data

US 2012/0028130 A1    Feb. 2, 2012

(30) Foreign Application Priority Data

Jul. 30, 2010 (JP) ................................ 2010-172297

(51) Int. Cl.
*H01M 6/16* (2006.01)
*H01M 4/131* (2010.01)
*H01M 4/505* (2010.01)
*H01M 4/525* (2010.01)
*H01M 4/62* (2006.01)
*H01M 10/056* (2010.01)
*C01G 45/12* (2006.01)
*C01G 51/00* (2006.01)
*C01G 53/00* (2006.01)
*H01M 4/04* (2006.01)

(52) U.S. Cl.
CPC .............. *H01M 4/131* (2013.01); *H01M 4/505* (2013.01); *H01M 4/525* (2013.01); *H01M 4/622* (2013.01); *H01M 10/056* (2013.01); *C01G 45/1228* (2013.01); *C01G 51/42* (2013.01); *C01G 51/50* (2013.01); *C01G 53/42* (2013.01); *C01G 53/50* (2013.01); *Y02E 60/122* (2013.01); *H01M 4/0404* (2013.01)
USPC .......................................... 429/324; 429/188

(58) Field of Classification Search
CPC ..... H01M 4/131; H01M 4/505; H01M 4/525; H01M 4/622; H01M 10/052; H01M 10/056; H01M 4/0404; C01G 45/1228; C01G 51/42; C01G 53/42; C01G 51/50; C01G 53/50; C01P 2002/52; C01P 2006/40; C01P 2002/72; Y02E 60/122

USPC ......................................................... 429/324
See application file for complete search history.

(56) References Cited

U.S. PATENT DOCUMENTS

| | | | |
|---|---|---|---|
| 2003/0129495 | A1 | 7/2003 | Yamato et al. |
| 2004/0028996 | A1 | 2/2004 | Hamamoto et al. |
| 2006/0199077 | A1 | 9/2006 | Iwanaga et al. |
| 2008/0160414 | A1 | 7/2008 | Jitsugiri et al. |
| 2010/0190064 | A1* | 7/2010 | Ikeda et al. ............... 429/330 |

FOREIGN PATENT DOCUMENTS

| | | | |
|---|---|---|---|
| JP | 2006-120650 | A | 5/2006 |
| JP | 2006-236725 | A | 9/2006 |
| JP | 2006-278322 | A | 10/2006 |
| JP | 2006-324235 | A | 11/2006 |
| JP | 2007-042302 | A | 2/2007 |
| JP | 4082214 | B2 | 4/2008 |
| JP | 2008-243448 | A | 10/2008 |
| JP | 2008243448 | A * | 10/2008 |
| JP | 2008-277086 | A | 11/2008 |
| JP | 2009-140787 | A | 6/2009 |
| JP | 2009-176528 | A | 8/2009 |
| JP | 2010-073686 | A | 4/2010 |
| WO | 2007/102407 | A1 | 9/2007 |

* cited by examiner

*Primary Examiner* — Gary Harris
(74) *Attorney, Agent, or Firm* — Westerman, Hattori, Daniels & Adrian LLP

(57) ABSTRACT

A non-aqueous electrolyte secondary cell having high temperature storage characteristics and cycle characteristics is provided.
This object is realized by adopting the following configuration.
The non-aqueous electrolyte secondary cell includes a positive electrode having a positive electrode active material; a negative electrode having a negative electrode active material; and a non-aqueous electrolyte having a non-aqueous solvent and an electrolyte salt. And the positive electrode active material contains a compound represented by $Li_a(Ni_bCo_cMn_d)_{1-x-y}W_xZr_yO_2$ ($0.9 \le a \le 1.2$, $0.3 \le b \le 0.6$, $0.1 \le c \le 0.7$, $0 \le d \le 0.4$, $b+c+d=1$, $0.001 \le x \le 0.05$, $0.001 \le y \le 0.05$); and the non-aqueous electrolyte contains at least one compound selected from the group consisting of cyclohexylbenzene, tert-butylbenzene and tert-amylbenzene in a total concentration of 0.1 to 5% by mass relative to the mass of the non-aqueous electrolyte.

8 Claims, No Drawings

NON-AQUEOUS ELECTROLYTE SECONDARY CELL

FIELD OF THE INVENTION

The present invention relates to a non-aqueous electrolyte secondary cell, and more specifically to a non-aqueous electrolyte secondary cell having excellent load characteristics.

BACKGROUND ART

Portable electronic devices such as a camcorder, a mobile phone and a laptop computer have been rapidly improved in compactness and weight reduction. As a driving power source for these devices, non-aqueous electrolyte secondary cells, which have high energy density and high capacity, are widely used.

Conventionally, as a positive electrode active material for a non-aqueous electrolyte secondary cell, lithium cobalt composite oxide ($LiCoO_2$) has been used because of its excellent discharge characteristics. However, cobalt is expensive because its abundance is small. Therefore, there has been focused on technologies of an active material using nickel ($Li_aNi_bCo_cMn_dO_2$, $0.9 \leq a \leq 1.2$, $0<b$, $b+c+d=1$) because nickel is more abundant and cheaper than cobalt.

For the purpose of preparing a nickel-containing active material, it is needed that a source of transition metals (nickel source, cobalt source, etc.) and a lithium source having an amount more than required are mixed, and that this mixture is calcined at a lower temperature than that for preparation of lithium cobalt composite oxide.

However, in such a method, an unreacted lithium source and a lithium compound such as a calcined lithium source are likely to remain on the surface of the calcined active material. These lithium compounds are reacted with the non-aqueous electrolyte to produce byproducts that adversely affect on charge/discharge reaction. Such a reaction is likely to occur particularly in case of high rate discharge or storage under a high temperature environment, leading to deterioration in high temperature storage characteristics and load discharge characteristics.

For reference, techniques of non-aqueous electrolyte secondary cells are disclosed in the following Patent Documents 1 to 8.
[Patent Documents]
[Patent Document 1]
Japanese Patent Application Publication No. 2008-243448
[Patent Document 2]
Japanese Patent Application Publication No. 2010-73686
[Patent Document 3]
Japanese Patent Application Publication No. 2007-42302
[Patent Document 4]
International Publication WO 2007/102407
[Patent Document 5]
Japanese Patent No. 4,082,214
[Patent Document 6]
Japanese Patent Application Publication No. 2006-120650
[Patent Document 7]
Japanese Patent Application Publication No. 2009-176528
[Patent Document 8]
Japanese Patent Application Publication No. 2008-277086

Patent Document 1 discloses a technique using a lithium transition metal composite oxide represented by the general formula (1) shown below. In a pore distribution curve of secondary particles of the lithium transition metal composite oxide measured by a mercury press-fitting method, there are a main peak top at a pore radius of more than 1 μm and 50 μm or less, and a sub peak top at a pore radius of 0.08 μm or more and 1 μm or less.

$$Li_XNi_\alpha Mn_\beta Co_\gamma Q_\delta W_Y O_2 \tag{1}$$

(Wherein, Q represents at least one element selected from Al, Fe, Ga, Sn, V, Cr, Cu, Zn, Mg, Ti, Ge, B, Bi, Nb, Ta, Mo, Zr, Ca and Mo. And the following formulas are satisfied: $0.2 \leq \alpha \leq 0.6$, $0.2 \leq \beta \leq 0.6$, $0 \leq Y \leq 0.5$, $0 \leq \delta \leq 0.1$, $0.8 \leq \alpha+\beta+Y+\delta \leq 1.2$, $0<x \leq 1.2$, $0<Y \leq 0.1$.)

The document states that this technique provides, at low cost, a lithium transition metal composite oxide that has high performances (high capacity, high rate characteristics, resistance characteristics, etc.) and is suitable for a positive electrode material of lithium secondary cells.

Patent Document 2 discloses a technique using, as an active material, particles of a lithium-containing composite oxide represented by the general formula: $Li_{1+x}Ni_{(1-y-z+b)/2}Mn_{(1-y-z-b)/2}Co_yM_zO_2$ (wherein M represents at least one element selected from the group consisting of Ti, Cr, Fe, Cu, Zn, Al, Ge, Sn, Mg, Ag, Ta, Nb, B, P, Zr, W and Ga; $-0.15 \leq x \leq 0.15$, $0 \leq y \leq 0.4$, $0 \leq z \leq 0.03$, $-0.1 \leq b \leq 0.96$, and $1-y-z-b>0$). In this composite oxide, Ni has an average valence of 2.2 to 2.9, and primary particles having a particle size of 1 μm or less are contained at 30% by volume or less relative to the total primary particles, and BET surface area is 0.3 m²/g or less.

The document states that this technique realizes a non-aqueous secondary cell having high capacity and excellent thermal stability.

Patent Document 3 discloses a technique using a positive electrode containing a first positive electrode material having an average composition represented by the chemical formula 1 and a second positive electrode material having an average composition represented by the chemical formula 2.

$$Li_aCo_{1-b}M1_bO_{2-c} \tag{Chemical formula 1}$$

(wherein M1 represents at least one of the group consisting of manganese (Mn), nickel (Ni), magnesium (Mg), aluminum (Al), boron (B), titanium (Ti), vanadium (V), chromium (Cr), iron (Fe), copper (Cu), zinc (Zn), gallium (Ga), yttrium (Y), zirconium (Zr), niobium (Nb), molybdenum (Mo), tin (Sn), calcium (Ca), strontium (Sr) and tungsten (W). The values a, b and c are within the following ranges: $0.9 \leq a \leq 1.1$, $0 \leq b \leq 0.3$, $-0.1 \leq c \leq 0.1$.)

$$Li_wNi_xCo_yMn_zM2_{1-x-y-z}O_{2-v} \tag{Chemical formula 2}$$

(wherein M2 represents at least one of the group consisting of magnesium (Mg), aluminum (Al), boron (B), titanium (Ti), vanadium (V), chromium (Cr), iron (Fe), copper (Cu), zinc (Zn), gallium (Ga), yttrium (Y), zirconium (Zr), niobium (Nb), molybdenum (Mo), tin (Sn), calcium (Ca), strontium (Sr) and tungsten (W). The values v, w, x, y and z are within the following ranges: $0.1 \leq v \leq 0.1$, $0.9<w \leq 1.1$, $0<x<1$, $0<y<0.7$, $0<z<0.5$, $0 \leq 1-x-y-z \leq 0.2$.)

The document states that this technology can improve charge/discharge efficiency in addition to energy density.

Patent Document 4 discloses a technique using, as a positive electrode active material, a lithium-containing composite oxide powder represented by the general formula $Li_pN_xM_yO_{zF_a}$ (wherein N is at least one element selected from the group consisting of Co, Mn and Ni. M is at least one element selected from the group consisting of Al, alkaline earth metal elements, and transition metal elements other than the element N. $0.9 \leq p \leq 1.1$, $0.965 \leq x<1.00$, $0<y \leq 0.035$, $1.9 \leq z \leq 2.1$, $x+y=1$, $0 \leq a \leq 0.02$). The lithium-containing composite oxide powder contains zirconium in its surface layer, and an atomic ratio (zirconium/the element N) within 5 nm from the surface layer 1.0 or more.

The document states that this technique can realize a non-aqueous electrolyte secondary cell having high operating voltage, high volume capacity density, high safety, and excellent charge/discharge cycle characteristics.

Patent Document 5 discloses a technique using a lithium composite oxide represented by the composition formula below (a) as a positive electrode active material. This lithium composite oxide shows X-ray diffraction pattern including a diffraction peak of a composite oxide of Li and W and/or of Li and Mo in addition to a main diffraction peak attributed to a hexagonal crystal structure.

$$Li_aNi_bCo_cMn_dM_eO_2 \quad (a)$$

(wherein M refers to one or two of W and Mo, $0.90 \leq a \leq 1.15$, $0 < b < 0.99$, $0 < c \leq 0.5$, $0 < d \leq 0.5$, $0 < c+d \leq 0.9$, $0.01 \leq e \leq 0.1$, and $b+c+d+e=1$ (however, when $b+c+d=x$, the following ranges are excluded: $1.00x \leq a \leq 1.15x$, $0.45x < b < 0.94x$, $0.05x < c \leq 0.35x$, $0.01x \leq d \leq 0.2x$, $0.06x \leq c+d \leq 0.55x$, and $0.0001x \leq e \leq 0.03x$.).

The document states that this technique can achieve a high performance cell having high initial capacity and keeping good thermal stability even after charging.

Patent Document 6 discloses a technique in which at least one of cyclohexylbenzene and tert-alkylbenzene derivatives is contained in a non-aqueous electrolyte solution in a total concentration of 0.1 to 10% by mass relative to the electrolyte solution.

The document states that this technique can achieve a lithium secondary cell that excels in cell characteristics including cycle characteristics, electric capacity, storage characteristics, and safety such as anti-overcharge, etc.

Patent Document 7 discloses a technique in which a lithium nickel composite oxide is used as a positive electrode active material, and lithium fluoroborate ($LiBF_4$) and tert-amylbenzene (TAB) are added to a non-aqueous electrolyte. The lithium nickel composite oxide is prepared by water washing a lithium nickel composite oxide having a constant specific surface area (S). The specific surface area after the washing (S') is 0.5 to 3.0 $m^2/g$, and the ratio of the specific surface areas before and after the washing (S'/S) is 1.5 to 4.0.

The document states that this technique provides a cell having excellent charge/discharge cycle characteristics and high temperature storage characteristics.

Patent Document 8 disclose a technique in which a lithium cobalt composite oxide having at least one of magnesium (Mg) and zirconium (Zr) is contained in a positive electrode active material, and 0.5 to 3.0% by mass of 1,3-dioxane is contained in a nonaqueous electrolyte.

The document states that this technique can realize a non-aqueous electrolyte secondary cell having excellent temperature storage characteristics and high safety at overcharging.

However, even with these technologies, a problem exists that high temperature storage characteristics and load characteristics of non-aqueous electrolyte secondary cells using a nickel-containing active material cannot be sufficiently improved.

SUMMARY OF THE INVENTION

The present invention has been made to solve the problems described above, and aims to improve high temperature storage characteristics and load characteristics of a non-aqueous electrolyte secondary cell using a nickel-containing active material.

The first aspect of the present invention for solving the above problems is configured as follows: a non-aqueous electrolyte secondary cell comprises a positive electrode having a positive electrode active material, a negative electrode having a negative electrode active material, and a non-aqueous electrolyte having a non-aqueous solvent and an electrolyte salt; the positive electrode active material contains a compound represented by $Li_a(Ni_bCo_cMn_d)_{1-x-y}W_xZr_yO_2$ ($0.9 \leq a \leq 1.2$, $0.3 \leq b \leq 0.6$, $0.1 \leq c \leq 0.7$, $0 \leq d \leq 0.4$, $b+c+d=1$, $0.001 \leq x \leq 0.05$, $0.001 \leq y \leq 0.05$); and the non-aqueous electrolyte contains at least one compound selected from the group consisting of cyclohexylbenzene, tert-butylbenzene and tert-amylbenzene in a total concentration of 0.1 to 5% by mass relative to the mass of the non-aqueous electrolyte.

In the above configuration, the tungsten element W contained in the lithium-nickel-cobalt containing composite oxide ($Li_a(Ni_bCo_cMn_d)_{1-x-y}W_xZr_yO_2$ is solid-dissolved in its crystal structure, and acts so as to facilitate intercalation/deintercalation reaction of lithium ions in the lithium-nickel-cobalt containing composite oxide. Meanwhile, the zirconium element Zr contained in the lithium-nickel-cobalt containing composite oxide covers the composite oxide, and acts so as to prevent elution of transition metals (Ni, Co, etc.) from the lithium-nickel-cobalt containing composite oxide. These actions inhibit reaction between the lithium-nickel-cobalt containing composite oxide and the non-aqueous electrolyte.

In addition, the non-aqueous electrolyte additive (at least one of cyclohexylbenzene, tert-butylbenzene and tert-amylbenzene) added to the non-aqueous electrolyte acts as to protect active sites on the surface of the lithium-nickel-cobalt containing composite oxide to inhibit reaction between the lithium-nickel-cobalt containing composite oxide and the non-aqueous electrolyte.

Then, these effects act synergistically to significantly inhibit the reaction between the lithium-nickel-cobalt containing composite oxide and the non-aqueous electrolyte (side reaction). As a result, reduction in high temperature storage characteristics and load characteristics due to the side reaction is significantly suppressed.

In brief, according to the above configuration, there are dramatically improved high temperature storage characteristics and load characteristics of the non-aqueous electrolyte secondary cell using lithium nickel-cobalt-containing composite oxide. Meanwhile, the synergistic effect is not obtained and therefore high temperature storage characteristics and load characteristics are not improved when at least one of the following requirements is not satisfied: the addition of tungsten and zirconium to the lithium-nickel-cobalt containing composite oxide; and the addition of the non-aqueous electrolyte additive.

Meanwhile, when the amount of tungsten element or zirconium element added to the lithium-nickel-cobalt containing composite oxide is excessive, structural stability of the lithium-nickel-cobalt containing composite oxide is reduced, and thereby the effect of improving high temperature storage characteristics and load characteristics cannot be sufficiently obtained.

In contrast, when the amount of tungsten element or zirconium element added to the lithium-nickel-cobalt containing composite oxide is too small, the above effect of improving high temperature storage characteristics and load characteristics cannot be obtained sufficiently. Therefore, in the formula ($Li_a(Ni_bCo_cMn_d)_{1-x-y}W_xZr_yO_2$), the content x of tungsten element is preferably 0.001 to 0.05, and the content y of zirconium element is preferably 0.001 to 0.05.

In addition, when the added amount of the non-aqueous electrolyte additive is too much, reaction of protecting the lithium-nickel-cobalt containing composite oxide proceeds excessively, thereby inhibiting smooth intercalation/deintercalation reaction of lithium ions on the surface of the lithium-nickel-cobalt containing composite oxide. As a result, the effect of improving high temperature storage characteristics and load characteristics cannot be sufficiently obtained. Meanwhile, when the added amount of the non-aqueous electrolyte additive is too small, the effect of improving high temperature storage characteristics and load characteristics cannot be sufficiently obtained. Therefore, the added amount (mass) of the non-aqueous electrolyte additive is preferably 0.1 to 5% by mass in total relative to the mass of the non-aqueous electrolyte.

Moreover, for the purpose of increasing structural stability of the lithium-nickel-cobalt containing composite oxide and obtaining good high temperature storage characteristics and load characteristics, some variables contained in $(Li_a(Ni_b Co_c Mn_d)_{1-x-y} W_x Zr_y O_2)$ are preferably within the following ranges: 0.3 to 0.6 for nickel content "b"; 0.1 to 0.7 for cobalt content "c"; and 0 to 0.4 for manganese content "d".

The second aspect of the present invention for solving the above problems is configured as follows: a non-aqueous electrolyte secondary cell comprises a positive electrode having a positive electrode active material, a negative electrode having a negative electrode active material, a non-aqueous electrolyte having a non-aqueous solvent and an electrolyte salt; the positive electrode active material contains a compound represented by $(Li_a(Ni_b Co_c Mn_d)_{1-x-y-z} W_x Zr_y M_z O_2)$ (M is at least one element selected from the group consisting of Ti, Nb, Mo, Zn, Al, Sn, Mg, Ca and Sr; $0.9 \leq a \leq 1.2$, $0.3 \leq b \leq 0.6$, $0.1 \leq c \leq 0.7$, $0 \leq d \leq 0.4$, $b+c+d=1$, $0.001 \leq x \leq 0.05$, $0.001 \leq y \leq 0.05$, $0.001 \leq z \leq 0.05$); and the non-aqueous electrolyte contains at least one compound selected from the group consisting of cyclohexylbenzene, tert-butylbenzene and tert-amylbenzene in a total concentration of 0.1 to 5% by mass relative to the mass of the non-aqueous electrolyte.

The second aspect of the present invention is the same as the first aspect except that the lithium-nickel-cobalt containing composite oxide to which zirconium and tungsten is added further contains a heterogeneous element M (M is at least one element selected from the group consisting of Ti, Nb, Mo, Zn, Al, Sn, Mg, Ca and Sr) in the molar ratio of 0.001 to 0.05. Also in this configuration, the same effect as the first aspect of the present invention can be obtained.

DETAILED DESCRIPTION OF THE INVENTION

The embodiments for carrying out the present invention will be described below in detail using Examples. It will be understood that the present invention will not be limited by the embodiments below; modifications are possible without departing from the scope of the present invention.

EXAMPLE 1

<Preparation of Positive Electrode Active Material>

Sodium bicarbonate was added to a mixture solution of Ni, Co and Mn sulfates, and then the resulting carbonates of Ni, Co and Mn were coprecipitate. Thereafter, the coprecipitated carbonates were subjected to a thermolysis reaction to afford oxides of Ni, Co and Mn as sources of transition metals.

The above-prepared transition metal sources, lithium carbonate as a source of lithium, and zirconium oxide and tungsten oxide as sources of additional elements were mixed in a mortar. Then, the resulting mixture was calcined in the air to afford lithium-nickel-cobalt-manganese composite oxide. Thereafter, the lithium-nickel-cobalt-manganese composite oxide was ground to an average particle size of 10 μm.

The resulting lithium-nickel-cobalt-manganese composite oxide was analyzed by ICP (Inductively Coupled Plasma) emission spectroscopy to determine its composition as $Li(Ni_{0.3}Co_{0.4}Mn_{0.3})_{0.949}W_{0.001}Zr_{0.05}O_2$.

This positive electrode active material, carbon powder as a conductive agent, and a dispersion in which polyvinylidene fluoride as a binder was dispersed in N-methyl-2-pyrrolidone (NMP) were mixed in a solid mass ratio of 94:3:3 to prepare a positive electrode active material slurry. This positive electrode active material slurry was applied on both surfaces of a positive electrode core (20 μm thickness) made of aluminum alloy.

This electrode plate was dried under vacuum to evaporate and remove NMP that had been needed in the slurry preparation. Then, the plate was rolled, and then was cut to a predetermined size to prepare a positive electrode.

<Preparation of the Negative Electrode>

Natural graphite as a negative electrode active material, styrene butadiene rubber as a binder, and carboxymethyl cellulose as a thickening agent were mixed in the mass ratio of 98:1:1, and further mixed with water to prepare a negative electrode active material slurry. Thereafter, this negative electrode active material slurry was applied on both surfaces of a negative electrode core (12 μm thick) made of copper.

This electrode plate was dried under vacuum to evaporate and remove water that had been needed in the slurry preparation. Then, the plate was rolled, and then was cut to a predetermined size to prepare a negative electrode.

The potential of the graphite is 0.1 V with respect to lithium. The fill amounts of the positive and negative electrode active materials were adjusted such that in the potential (4.3 V with respect to lithium in this example, with the voltage being 4.2 V) of the positive electrode active material, which is the standard potential for design, the charge capacity ratio of the positive and negative electrodes (negative electrode charge capacity/positive electrode charge capacity) was 1.1.

<Fabrication of the Electrode Assembly>

The positive and negative electrodes and a separator made of a polyethylene microporous film were laminated and wound using a winder to complete an electrode assembly.

<Preparation of Non-Aqueous Electrolyte>

Ethylene carbonate (EC), dimethyl carbonate (DMC), methylethyl carbonate (MEC), vinylene carbonate (VC), tert-amylbenzene (TAB) and LiPF6 were mixed in a mass ratio of 25:47:10:2:1:15 to prepare a non-aqueous electrolyte.

Vinylene carbonate is an additive that reacts with the graphite negative electrode to form a coating to protect the negative electrode, but is not an essential component of the present invention.

<Cell Assembly>

The above-mentioned electrode assembly was inserted to a cylindrical outer can. Then, a negative electrode current collector plate was connected to the bottom of the outer can, and a positive electrode current collector plate was connected to the sealing plate. Thereafter, the above-prepared non-aqueous electrolyte was injected, and the opening of the cylindrical outer can was sealed by swaging to complete a non-aqueous electrolyte secondary cell according to Example 1 having a diameter of 18 mm and a height of 65 mm.

EXAMPLE 2

A non-aqueous electrolyte secondary cell according to Example 2 was fabricated in the similar manner to the above Example 1 except for using Li(Ni$_{0.3}$Co$_{0.4}$Mn$_{0.3}$)$_{0.9}$W$_{0.05}$Zr$_{0.05}$O$_2$ as a positive electrode active material.

EXAMPLE 3

A non-aqueous electrolyte secondary cell according to Example 3 was fabricated in the similar manner to the above Example 1 except for using Li(Ni$_{0.3}$Co$_{0.4}$Mn$_{0.3}$)$_{0.949}$W$_{0.05}$Zr$_{0.001}$O$_2$ as a positive electrode active material.

EXAMPLE 4

A non-aqueous electrolyte secondary cell according to Example 4 was fabricated in the similar manner to the above Example 1 except for using a non-aqueous electrolyte composed of a mixture of EC, DMC, MEC, VC, TAB and LiPF6 in a mass ratio of 25:47.9:10:2:0.1:15.

EXAMPLE 5

A non-aqueous electrolyte secondary cell according to Example 5 was fabricated in the similar manner to the above Example 1 except for using a non-aqueous electrolyte composed of a mixture of EC, DMC, MEC, VC, TAB and LiPF6 in a mass ratio of 25:43:10:2:5:15.

EXAMPLE 6

A non-aqueous electrolyte secondary cell according to Example 6 was fabricated in the similar manner to the above Example 1 except for using Li(Ni$_{0.6}$Co$_{0.4}$)$_{0.9}$W$_{0.05}$Zr$_{0.05}$O$_2$ as a positive electrode active material.

EXAMPLE 7

A non-aqueous electrolyte secondary cell according to Example 7 was fabricated in the similar manner to the above Example 1 except for using Li(Ni$_{0.6}$Co$_{0.3}$Mn$_{0.1}$)$_{0.9}$W$_{0.05}$Zr$_{0.05}$O$_2$ as a positive electrode active material.

EXAMPLE 8

A non-aqueous electrolyte secondary cell according to Example 8 was fabricated in the similar manner to the above Example 1 except for using Li(Ni$_{0.6}$Co$_{0.1}$Mn$_{0.3}$)$_{0.9}$W$_{0.05}$Zr$_{0.05}$O$_2$ as a positive electrode active material.

EXAMPLE 9

A non-aqueous electrolyte secondary cell according to Example 9 was fabricated in the similar manner to the above Example 1 except for using Li(Ni$_{0.5}$Co$_{0.3}$Mn$_{0.2}$)$_{0.9}$W$_{0.05}$Zr$_{0.05}$O$_2$ as a positive electrode active material.

EXAMPLE 10

A non-aqueous electrolyte secondary cell according to Example 10 was fabricated in the similar manner to the above Example 1 except for using Li(Ni$_{0.5}$Co$_{0.2}$Mn$_{0.3}$)$_{0.9}$W$_{0.05}$Zr$_{0.05}$O$_2$ as a positive electrode active material.

EXAMPLE 11

A non-aqueous electrolyte secondary cell according to Example 11 was fabricated in the similar manner to the above Example 1 except for using Li(Ni$_{0.4}$Co$_{0.3}$Mn$_{0.3}$)$_{0.9}$W$_{0.05}$Zr$_{0.05}$O$_2$ as a positive electrode active material.

EXAMPLE 12

A non-aqueous electrolyte secondary cell according to Example 12 was fabricated in the similar manner to the above Example 1 except for using Li(Ni$_{0.4}$Co$_{0.2}$Mn$_{0.4}$)$_{0.9}$W$_{0.05}$Zr$_{0.05}$O$_2$ as a positive electrode active material.

EXAMPLE 13

A non-aqueous electrolyte secondary cell according to Example 13 was fabricated in the similar manner to the above Example 1 except for using Li(Ni$_{0.3}$Co$_{0.7}$)$_{0.9}$W$_{0.05}$Zr$_{0.05}$O$_2$ as a positive electrode active material.

EXAMPLE 14

A non-aqueous electrolyte secondary cell according to Example 14 was fabricated in the similar manner to the above Example 1 except for using Li(Ni$_{0.3}$Co$_{0.5}$Mn$_{0.2}$)$_{0.9}$W$_{0.05}$Zr$_{0.05}$O$_2$ as a positive electrode active material.

EXAMPLE 15

A non-aqueous electrolyte secondary cell according to Example 15 was fabricated in the similar manner to the above Example 2 except for using tert-butylbenzene (TBB) in place of tert-amylbenzene (TAB).

EXAMPLE 16

A non-aqueous electrolyte secondary cell according to Example 16 was fabricated in the similar manner to the above Example 2 except for using cyclohexylbenzene (CHB) in place of tert-amylbenzene (TAB).

COMPARATIVE EXAMPLE 1

A non-aqueous electrolyte secondary cell according to Comparative Example 1 was fabricated in the similar manner to the above Example 1 except for using Li(Ni$_{0.3}$Co$_{0.4}$Mn$_{0.3}$)$_{0.95}$Zr$_{0.05}$O$_2$ as a positive electrode active material.

COMPARATIVE EXAMPLE 2

A non-aqueous electrolyte secondary cell according to Comparative Example 2 was fabricated in the similar manner to the above Example 1 except for using Li(Ni$_{0.3}$Co$_{0.4}$Mn$_{0.3}$)$_{0.85}$W$_{0.01}$Zr$_{0.05}$O$_2$ as a positive electrode active material.

COMPARATIVE EXAMPLE 3

A non-aqueous electrolyte secondary cell according to Comparative Example 3 was fabricated in the similar manner to the above Example 1 except for using Li(Ni$_{0.3}$Co$_{0.4}$Mn$_{0.3}$)$_{0.95}$W$_{0.05}$O$_2$ as a positive electrode active material.

COMPARATIVE EXAMPLE 4

A non-aqueous electrolyte secondary cell according to Comparative Example 4 was fabricated in the similar manner to the above Example 1 except for using Li(Ni$_{0.3}$Co$_{0.4}$Mn$_{0.3}$)$_{0.85}$W$_{0.05}$Zr$_{0.1}$O$_2$ as a positive electrode active material.

COMPARATIVE EXAMPLE 5

A non-aqueous electrolyte secondary cell according to Comparative Example 5 was fabricated in the similar manner to the above Example 1 except for using a non-aqueous electrolyte composed of a mixture of EC, DMC, MEC, VC and LiPF6 in a mass ratio of 25:48:10:2:15 (a non-aqueous electrolyte containing no TAB).

COMPARATIVE EXAMPLE 6

A non-aqueous electrolyte secondary cell according to Comparative Example 6 was fabricated in the similar manner to the above Example 1 except for using a non-aqueous electrolyte composed of a mixture of EC, DMC, MEC, VC, TAB and LiPF6 in a mass ratio of 25:38:10:2:10:15.

COMPARATIVE EXAMPLE 7

A non-aqueous electrolyte secondary cell according to Comparative Example 7 was fabricated in the similar manner to the above Example 1 except for using Li(Ni$_{0.8}$Mn$_{0.2}$)$_{0.9}$W$_{0.05}$Zr$_{0.05}$O$_2$ as a positive electrode active material.

COMPARATIVE EXAMPLE 8

A non-aqueous electrolyte secondary cell according to Comparative Example 8 was fabricated in the similar manner to the above Example 1 except for using Li(Ni$_{0.6}$Mn$_{0.4}$)$_{0.9}$W$_{0.05}$Zr$_{0.05}$O$_2$ as a positive electrode active material.

COMPARATIVE EXAMPLE 9

A non-aqueous electrolyte secondary cell according to Comparative Example 9 was fabricated in the similar manner to the above Example 1 except for using Li(Ni$_{0.4}$Co$_{0.1}$Mn$_{0.5}$)$_{0.9}$W$_{0.05}$Zr$_{0.05}$O$_2$ as a positive electrode active material.

COMPARATIVE EXAMPLE 10

A non-aqueous electrolyte secondary cell according to Comparative Example 10 was fabricated in the similar manner to the above Example 1 except for using Li(Ni$_{0.3}$Co$_{0.2}$Mn$_{0.5}$)$_{0.9}$W$_{0.05}$Zr$_{0.05}$O$_2$ as a positive electrode active material.

COMPARATIVE EXAMPLE 11

A non-aqueous electrolyte secondary cell according to Comparative Example 11 was fabricated in the similar manner to the above Example 1 except for using Li(Ni$_{0.2}$Co$_{0.8}$)$_{0.9}$W$_{0.05}$Zr$_{0.05}$O$_2$ as a positive electrode active material.

COMPARATIVE EXAMPLE 12

A non-aqueous electrolyte secondary cell according to Comparative Example 12 was fabricated in the similar manner to the above Example 1 except for using Li(Ni$_{0.2}$Co$_{0.7}$Mn$_{0.1}$)$_{0.9}$W$_{0.05}$Zr$_{0.05}$O$_2$ as a positive electrode active material.

COMPARATIVE EXAMPLE 13

A non-aqueous electrolyte secondary cell according to Comparative Example 13 was fabricated in the similar manner to the above Example 1 except for using Li(Ni$_{0.3}$Co$_{0.4}$Mn$_{0.3}$)$_{0.9}$Al$_{0.05}$Zr$_{0.05}$O$_2$ as a positive electrode active material. As an aluminium source, aluminium oxide was used.

COMPARATIVE EXAMPLE 14

A non-aqueous electrolyte secondary cell according to Comparative Example 14 was fabricated in the similar manner to the above Example 1 except for using Li(Ni$_{0.3}$Co$_{0.4}$Mn$_{0.3}$)$_{0.9}$Mg$_{0.05}$Zr$_{0.05}$O$_2$ as a positive electrode active material. As a magnesium source, magnesium oxide was used.

[High Temperature Storage Test]

One cell was prepared for each of Examples 1 to 16 and Comparative Examples 1 to 14. The cell was fabricated in the same manner as described in each of Examples and Comparative Examples. Each cell was charged at a constant current of 1 It (1500 mA) to a voltage of 4.2 V, and then was charged at a constant voltage of 4.2 V to a current of 30 mA. Thereafter, the cell was discharged at a constant current of 1 It (1500 mA) to a voltage of 2.75 V. The discharge capacity at this time was defined as capacity before storage. The above charging and discharging were all performed at 25° C.

Next, the cell was charged at a constant current of 1 It (1500 mA) to a voltage of 4.2 V, and then was charged at a constant voltage of 4.2 V to a current of 30 mA. Then, the cell was stored in a thermostatic chamber at 70° C. for 300 hours. Thereafter, the cell was removed from the thermostatic chamber, naturally cooled to a room temperature (25° C.), and discharged at a constant current of 1 It (1500 mA) to a voltage of 2.75 V. The discharge capacity at this time was defined as capacity after storage. The above charging and discharging were all performed at 25° C. Then, capacity retention rate was calculated using the following equation.

High temperature storage capacity retention rate (%)=Capacity after storage÷Capacity before storage×100

[High Load Discharge Cycle Characteristics Test]

One cell was prepared for each of Examples 1 to 16 and Comparative Examples 1 to 14. The cell was fabricated in the same manner as described in each of the Examples and Comparative Examples. Each cell was charged at a constant current of 1 It (1500 mA) to a voltage of 4.2 V, then charged at a constant voltage of 4.2 V to a current of 30 mA, and then discharged at a constant current of 10 It (15A) to a voltage of 2.5 V. These charging and discharging were defined as one cycle, and 200 cycles were performed. The charging and discharging were all performed at 25° C. Cycle capacity retention rate was calculated using the following equation.

Cycle capacity retention rate (%)=200th cycle discharge capacity÷First cycle discharge capacity×100

Results of the above tests in addition to the compositions of the positive electrode active material and non-aqueous electrolyte additives are shown in the following Tables 1 to 3.

TABLE 1

| | Composition of Positive electrode active material | | | | Capacity retention rate (%) | |
|---|---|---|---|---|---|---|
| | Ni:Co:Mn | Mol ratio of W | Mol ratio of Zr | Amount of TAB (mass %) | High temperature storage | Cycle |
| C.E. 1 | 0.3:0.4:0.3 | 0 | 0.05 | 1 | 89 | 86 |
| Ex. 1 | 0.3:0.4:0.3 | 0.001 | 0.05 | 1 | 93 | 93 |
| Ex. 2 | 0.3:0.4:0.3 | 0.05 | 0.05 | 1 | 93 | 94 |
| C.E. 2 | 0.3:0.4:0.3 | 0.1 | 0.05 | 1 | 87 | 87 |
| C.E. 3 | 0.3:0.4:0.3 | 0.05 | 0 | 1 | 84 | 84 |
| Ex. 3 | 0.3:0.4:0.3 | 0.05 | 0.001 | 1 | 94 | 93 |
| Ex. 2 | 0.3:0.4:0.3 | 0.05 | 0.05 | 1 | 93 | 94 |
| C.E. 4 | 0.3:0.4:0.3 | 0.05 | 0.1 | 1 | 89 | 88 |
| C.E. 5 | 0.3:0.4:0.3 | 0.05 | 0.05 | 0 | 86 | 85 |
| Ex. 4 | 0.3:0.4:0.3 | 0.05 | 0.05 | 0.1 | 93 | 93 |
| Ex. 5 | 0.3:0.4:0.3 | 0.05 | 0.05 | 5 | 93 | 93 |
| C.E. 6 | 0.3:0.4:0.3 | 0.05 | 0.05 | 10 | 88 | 87 |
| C.E. 7 | 0.8:0.0:0.2 | 0.05 | 0.05 | 1 | 83 | 85 |
| Ex. 6 | 0.6:0.4:0.0 | 0.05 | 0.05 | 1 | 92 | 92 |
| Ex. 7 | 0.6:0.3:0.1 | 0.05 | 0.05 | 1 | 93 | 92 |
| Ex. 8 | 0.6:0.1:0.3 | 0.05 | 0.05 | 1 | 93 | 92 |
| C.E. 8 | 0.6:0.0:0.4 | 0.05 | 0.05 | 1 | 87 | 84 |
| Ex. 9 | 0.5:0.3:0.2 | 0.05 | 0.05 | 1 | 93 | 93 |
| Ex. 10 | 0.5:0.2:0.3 | 0.05 | 0.05 | 1 | 93 | 92 |
| Ex. 11 | 0.4:0.3:0.3 | 0.05 | 0.05 | 1 | 94 | 94 |
| Ex. 12 | 0.4:0.2:0.4 | 0.05 | 0.05 | 1 | 93 | 91 |
| C.E. 9 | 0.4:0.1:0.5 | 0.05 | 0.05 | 1 | 87 | 71 |
| Ex. 13 | 0.3:0.7:0.0 | 0.05 | 0.05 | 1 | 92 | 92 |
| Ex. 14 | 0.3:0.5:0.2 | 0.05 | 0.05 | 1 | 93 | 92 |
| C.E. 10 | 0.3:0.2:0.5 | 0.05 | 0.05 | 1 | 87 | 71 |
| C.E. 11 | 0.2:0.8:0.0 | 0.05 | 0.05 | 1 | 88 | 87 |
| C.E. 12 | 0.2:0.7:0.1 | 0.05 | 0.05 | 1 | 88 | 87 |

TABLE 2

| | Composition of Positive electrode active material | | | Additives | | Capacity retention rate (%) | |
|---|---|---|---|---|---|---|---|
| | Ni:Co:Mn | Mol ratio of W | Mol ratio of Zr | Kind | Added amount (mass %) | High temperature storage | Cycle |
| Ex. 2 | 0.3:0.4:0.3 | 0.05 | 0.05 | TAB | 1 | 93 | 94 |
| Ex. 15 | 0.3:0.4:0.3 | 0.05 | 0.05 | TBB | 1 | 93 | 94 |
| Ex. 16 | 0.3:0.4:0.3 | 0.05 | 0.05 | CHB | 1 | 93 | 94 |

TABLE 3

| | Composition of Positive electrode active material | | | | Capacity retention rate (%) | |
|---|---|---|---|---|---|---|
| | Ni:Co:Mn | Hetero element: Mol ratio | Mol ratio of Zr | Amount of TAB (mass %) | High temperature storage | Cycle |
| Ex. 2 | 0.3:0.4:0.3 | W: 0.05 | 0.05 | 1 | 93 | 94 |
| C.E. 13 | 0.3:0.4:0.3 | Al: 0.05 | 0.05 | 1 | 89 | 83 |
| C.E. 14 | 0.3:0.4:0.3 | Mg: 0.05 | 0.05 | 1 | 87 | 83 |
| C.E. 1 | 0.3:0.4:0.3 | — | 0.05 | 1 | 89 | 86 |
| C.E. 3 | 0.3:0.4:0.3 | W: 0.05 | — | 1 | 84 | 84 |

From above Table 1, it is found as follows. Comparative Example 1, in which tungsten (W) is not contained in the lithium-nickel-cobalt containing composite oxide, shows high temperature storage capacity retention rate of 89% and cycle capacity retention rate of 86%, and Comparative Example 2, in which tungsten (W) with a molar ratio of 0.1 is contained in the lithium-nickel-cobalt containing composite oxide, shows high temperature storage capacity retention rate of 87% and cycle capacity retention rate of 87%. In contrast, Examples 1 and 2, in which tungsten (W) with a molar ratio of 0.001 to 0.05 in addition to (Zr) are contained in the lithium-nickel-cobalt containing composite oxide, show high temperature storage capacity retention rates of 93% (both) and cycle capacity retention rates of 93% and 94%, respectively. Therefore, the cells according to Examples 1 and 2 are superior to those according to Comparative Examples 1 and 2.

Also, it is found as follows. Comparative Example 3, in which zirconium (Zr) is not contained in the lithium-nickel-cobalt containing composite oxide, shows high temperature storage capacity retention rate of 84% and cycle capacity retention rate of 84%, and Comparative Example 4, in which zirconium (Zr) with a molar ratio of 0.1 is contained in the lithium-nickel-cobalt containing composite oxide, shows high temperature storage capacity retention rate of 89% and cycle capacity retention rate of 88%. In contrast, Examples 2 and 3, in which zirconium (Zr) with a molar ratio of 0.001 to 0.05 in addition to tungsten (W) are contained in the lithium-nickel-cobalt containing composite oxide, show high temperature storage capacity retention rates of 93% and 94% and cycle capacity retention rates of 94% and 93%, respectively. Therefore, the cells according to Examples 2 and 3 are superior to those according to Comparative Examples 3 and 4.

Moreover, it is found as follows. Comparative Example 5, in which tert-amylbenzene (TAB) is not contained in the non-aqueous electrolyte, shows high temperature storage capacity retention rate of 86% and cycle capacity retention rate of 85%, and Comparative Example 6, in which tert-amylbenzene (TAB) with 10% by mass is contained in the non-aqueous electrolyte, shows high temperature storage capacity retention rate of 88% and cycle capacity retention rate of 87%. In contrast, Examples 2, 4 and 5, in which tert-amylbenzene (TAB) with 0.1 to 5% by mass is contained in each non-aqueous electrolyte, show high temperature storage capacity retention rates of 93% (all) and cycle capacity retention rates of 93% to 94%. Therefore, the cells of Examples 2, 4 and 5 are superior to those of Comparative Examples 5 and 6.

These things can be explained as follows. Tungsten element is solid-dissolved into the lithium-nickel-cobalt containing composite oxide, thereby facilitating charge/discharge reactions (intercalation/deintercalation reaction of lithium ions) of the lithium-nickel-cobalt containing composite oxide. In addition, the lithium-nickel-cobalt containing composite oxide is covered with zirconium so as to prevent elution of transition metal elements (Ni, Co, Mn) from the lithium-nickel-cobalt containing composite oxide. As a result, reaction between the lithium-nickel-cobalt containing composite oxide and the non-aqueous electrolyte is inhibited.

In addition, tert-amylbenzene acts as to protect active sites on the surface of the lithium-nickel-cobalt containing composite oxide to further inhibit the reaction between the lithium-nickel-cobalt containing composite oxide and the non-aqueous electrolyte. These act synergistically to significantly prevent the reaction between the lithium-nickel-cobalt containing composite oxide and the non-aqueous electrolyte, leading to significant improvement in high temperature storage characteristics and cycle characteristics.

If at least one of the two additions (the addition of tungsten and zirconium to the lithium-nickel-cobalt containing composite oxide; and the addition of the non-aqueous electrolyte additive (tert-amylbenzene)) is not performed, such a synergistic effect is not obtained, and high temperature storage characteristics and cycle characteristics are not improved.

The excessive amount of tungsten or zirconium to the lithium-nickel-cobalt containing composite oxide reduces structural stability of the lithium-nickel-cobalt containing composite oxide, and thereby the effect of improving high temperature storage characteristics and cycle characteristics is not sufficiently provided.

When the amount of tungsten or zirconium to the lithium-nickel-cobalt containing composite oxide is too small, the effect of improving high temperature storage characteristics and cycle characteristics is not sufficiently provided.

Therefore, in the formula $(Li_a(Ni_bCo_cMn_d)_{1-x-y}W_xZr_yO_2)$, the content x of tungsten element is preferably 0.001 to 0.05, and the content y of zirconium element is preferably 0.001 to 0.05.

In addition, when the amount of the non-aqueous electrolyte additive (tert-amylbenzene) is too large, reaction of protecting the lithium-nickel-cobalt containing composite oxide becomes excessive, thereby inhibiting smooth charge/discharge reaction on the surface of the lithium-nickel-cobalt containing composite oxide. As a result, the effect of improving high temperature storage characteristics and cycle characteristics cannot be obtained sufficiently. Meanwhile, when the amount of the non-aqueous electrolyte additive (tert-amylbenzene) is too small, the effect of improving high temperature storage characteristics and cycle characteristics cannot be obtained sufficiently.

Therefore, the added amount (mass) of the non-aqueous electrolyte additive (tert-amylbenzene) is preferably 0.1 to 5% by mass relative to the mass of the non-aqueous electrolyte.

In Examples 2 and 6 to 14, each composition in $(Li_a(Ni_bCo_cMn_d)_{1-x-y}W_xZr_yO_2)$ is within the following ranges: 0.3 to 0.6 for nickel content b; 0.1 to 0.7 for cobalt content c; and 0 to 0.4 for manganese content d. These Examples all show high temperature storage capacity retention rates of 92 to 94% and cycle capacity retention rates of 91 to 94%. Conversely, Comparative Examples 7 to 12, in which at least one of nickel content b, cobalt content c and manganese content d does not fall into the above range, show high temperature storage capacity retention rates of 83 to 88% and cycle capacity retention rates of 71 to 87%. Therefore, it is found that the cells according to Examples 2 and 6 to 14 are more excellent than those according to Comparative Examples 7 to 12.

This can be explained as follows. When nickel content "b", cobalt content "c" and manganese content "d" are respectively within 0.3 to 0.6, 0.1 to 0.7 and 0 to 0.4 in $(Li_a(Ni_bCo_cMn_d)_{1-x-y}W_xZr_yO_2$, there is improved structural stability of the lithium-nickel-cobalt containing composite oxide to which tungsten and zirconium are added. Meanwhile, when at least one of the contents b, c and d does not fall in the above range, there is not sufficiently improved structural stability of the lithium-nickel-cobalt containing composite oxide to which tungsten and zirconium are added, and therefore high temperature storage characteristics and cycle characteristics are not improved.

Thus, in $(Li_a(Ni_bCo_cMn_d)_{1-x-y}W_xZr_yO_2$, nickel content b, cobalt content c and manganese content d are preferably 0.3 to 0.6, 0.1 to 0.7 and 0 to 0.4, respectively.

From Table 2, it is found that excellent high temperature storage capacity retention rate (93% all) and cycle capacity retention rate (94% all) can be achieved when using tert-amylbenzene (Example 2), tert-butylbenzene (Example 15) or cyclohexylbenzene (Example 16) as a non-aqueous electrolyte additive.

Moreover, from Table 3, it is found as follows. High temperature storage capacity retention rates of 84 to 89% and cycle capacity retention rates of 83 to 86% are shown in the following Comparative Examples: Comparative Example 1 in which tungsten (W) is not contained in the lithium-nickel-cobalt containing composite oxide; Comparative Example 3 in which zirconium (Zr) is not contained in the lithium-nickel-cobalt containing composite oxide: Comparative Example 13 in which aluminum (Al) is added instead of Tungsten (W) to the lithium-nickel-cobalt containing composite oxide; and Comparative Example 14 in which magnesium (Mg) is added instead of Tungsten (W) to the lithium-nickel-cobalt containing composite oxide. Meanwhile, Example 2, in which both tungsten (W) and zirconium (Zr) is added to the lithium-nickel-cobalt containing composite oxide, shows high temperature storage capacity retention rate of 93% and cycle capacity retention rates of 94%. Therefore, the cell according to Example 2 is superior to those according to the above Comparative Examples.

From the above, it is found that in order to achieve excellent high temperature storage retention rate and cycle capacity retention rate, both tungsten and zirconium should be added to the lithium-nickel-cobalt containing composite oxide.

Moreover, from comparison of Comparative Examples 13 and 14, in which magnesium or aluminum as well as zirconium are added, with Comparative Example 1 in which only zirconium is added, it is found that there is no significant difference in high temperature storage characteristics and cycle characteristics. Therefore, even when aluminum, magnesium or the like is further added to lithium-nickel-cobalt containing composite oxide to which zirconium and tungsten are added, the effect of the present invention is considered to be obtained.

(Supplementary Remarks)

The lithium-nickel-cobalt containing composite oxide to which tungsten and zirconium are added may further contain a heterogeneous element M (M is at least one element selected from the group consisting of Ti, Nb, Mo, Zn, Al, Sn, Mg, Ca, and Sr) in the molar ratio of 0.001 to 0.05.

Moreover, besides the lithium-nickel-cobalt containing composite oxide to which tungsten and zirconium are added or the lithium-nickel-cobalt containing composite oxide to which tungsten, zirconium and a further heterogeneous element are added, there may be further contained known positive electrode active materials such as lithium cobalt composite oxide, spinel lithium manganese oxide and olivine-type lithium iron phosphate.

The lithium-nickel-cobalt containing composite oxide to which tungsten and zirconium are added and/or the lithium-nickel-cobalt containing composite oxide to which tungsten, zirconium and a further heterogeneous element are added are used in a concentration of preferably 50% by mass or more in total, and more preferably 70% by mass or more in total, relative to the total mass of the positive electrode active material.

As the negative electrode active material, there can be used natural graphite, artificial graphite, non- graphitizable carbon, graphitizable carbon, fibrous carbon, coke, carbon black and the like.

As the separator, a porous membrane made of olefin resin such as polyethylene and polypropylene can be used. The porous membrane may have a single-layer structure or a multilayer structure.

As a solvent in the non-aqueous electrolyte solution, the following compounds can be used alone or in mixture of two or more kinds: cyclic carbonates such as ethylene carbonate, propylene carbonate, butylene carbonate, vinylene carbonate and fluoroethylene carbonate; lactones such as Y-butyrolactone and Y-valerolactone; linear carbonates such as diethyl carbonate, dimethyl carbonate and methyl ethyl carbonate;

ethers such as tetrahydrofuran, 1,2-dimethoxy ethane, diethylene glycol, dimethyl ether, 1,3-dioxolane, 2-methoxy tetrahydrofuran and diethyl ether; and esters such as ethyl acetate and propyl acetate.

As an electrolyte salt in the non-aqueous electrolyte solution, the following compounds can be used alone or in mixture of two or more kinds: $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$, $Li_2B_{10}Cl_{10}$, $Li_2B_{12}Cl_{12}$, $LiB(C_2O_4)_2F_2$, and $LiP(C_2O_4)_2F_4$. The concentration of the electrolyte salt is preferably 0.5 to 2.0 M (mol/l).

In addition, the non-aqueous electrolyte solution may contain known additives such as vinylene carbonate, vinyl ethylene carbonate and fluoro ethylene carbonate.

[The Availability of the Industry]

As described above, the present invention provides the effect that can dramatically improve high temperature storage characteristics and cycle characteristics of a non-aqueous electrolyte secondary cell using a nickel-base positive electrode active material. Since the nickel-based positive electrode active material is cheaper than lithium cobalt composite oxide that is a conventional positive electrode active material, there can be realized at low cost a non-aqueous electrolyte secondary cell having excellent high temperature storage characteristics and cycle characteristics. Thus, the industrial applicability is significant.

What is claimed is:

1. A non-aqueous electrolyte secondary cell comprises:
a positive electrode having a positive electrode active material;
a negative electrode having a negative electrode active material; and
a non-aqueous electrolyte having a non-aqueous solvent and an electrolyte salt,
wherein
the positive electrode active material contains a compound represented by $Li_a(Ni_bCo_cMn_d)_{1-x-y}W_xZr_yO_2$ ($0.9 \leq a \leq 1.2$, $0.3 \leq b \leq 0.6$, $0.1 \leq c \leq 0.7$, $0 \leq d \leq 0.4$, $b+c+d=1$, $0.001 \leq x \leq 0.05$, $0.001 \leq y \leq 0.05$); and
the non-aqueous electrolyte contains at least one compound selected from the group consisting of cyclohexylbenzene, tert-butylbenzene and tert-amylbenzene in a total concentration of 0.1 to 5% by mass relative to the mass of the non-aqueous electrolyte.

2. A non-aqueous electrolyte secondary cell comprises:
a positive electrode having a positive electrode active material;
a negative electrode having a negative electrode active material; and
a non-aqueous electrolyte having a non-aqueous solvent and an electrolyte salt,
wherein
the positive electrode active material contains a compound represented by $(Li_a(Ni_bCo_cMn_d)_{1-x-y-z}W_xZr_yM_zO_2)$ (M is at least one element selected from the group consisting of Ti, Nb, Mo, Zn, Al, Sn, Mg, Ca, and Sr; $0.9 \leq a \leq 1.2$, $0.3 \leq b \leq 0.6$, $0.1 \leq c \leq 0.7$, $0 \leq d \leq 0.4$, $b+c+d=1$, $0.001 \leq x \leq 0.05$, $0.001 \leq y \leq 0.05$, $0.001 \leq z \leq 0.05$); and
the non-aqueous electrolyte contains at least one compound selected from the group consisting of cyclohexylbenzene, tert-butylbenzene and tert-amylbenzene in a total concentration of 0.1 to 5% by mass relative to the mass of the non-aqueous electrolyte.

3. The non-aqueous electrolyte secondary cell according to claim 1, wherein the non-aqueous electrolyte contains tert-amylbenzene.

4. The non-aqueous electrolyte secondary cell according to claim 2, wherein the non-aqueous electrolyte contains tert-amylbenzene.

5. The non-aqueous electrolyte secondary cell according to claim 1, wherein the non-aqueous electrolyte contains tert-butylbenzene.

6. The non-aqueous electrolyte secondary cell according to claim 2, wherein the non-aqueous electrolyte contains tert-butylbenzene.

7. The non-aqueous electrolyte secondary cell according to claim 1, wherein the non-aqueous electrolyte contains cyclohexylbenzene.

8. The non-aqueous electrolyte secondary cell according to claim 2, wherein the non-aqueous electrolyte contains cyclohexylbenzene.

* * * * *